(12) United States Patent
Zhang et al.

(10) Patent No.: US 10,995,946 B2
(45) Date of Patent: May 4, 2021

(54) CYCLONE SEPARATOR HAVING CENTRAL CYLINDER MADE OF NON-METAL REFRACTORY MATERIAL

(71) Applicant: Jiangsu Huawei Machinery Manufacturing Co., Ltd, Jiangsu (CN)

(72) Inventors: Lianhua Zhang, Yancheng (CN); Baijin Chen, Yancheng (CN); Ji Wang, Yancheng (CN); Hui Zhang, Yancheng (CN); Yunlong Qiu, Yancheng (CN)

(73) Assignee: JIANGSU HUAWEI MACHINERY MANUFACTURING CO., LTD, Jiangsu (CN)

(*) Notice: Subject to any disclaimer, the term of this patent is extended or adjusted under 35 U.S.C. 154(b) by 163 days.

(21) Appl. No.: 16/487,075

(22) PCT Filed: Jun. 13, 2017

(86) PCT No.: PCT/CN2017/088077
§ 371 (c)(1),
(2) Date: Aug. 19, 2019

(87) PCT Pub. No.: WO2018/149062
PCT Pub. Date: Aug. 23, 2018

(65) Prior Publication Data
US 2019/0376686 A1 Dec. 12, 2019

(30) Foreign Application Priority Data

Feb. 20, 2017 (CN) .......................... 201710089043.5

(51) Int. Cl.
*F23C 10/08* (2006.01)
*B01J 8/00* (2006.01)
(Continued)

(52) U.S. Cl.
CPC ............. *F23C 10/08* (2013.01); *B01J 8/0055* (2013.01); *B04C 5/04* (2013.01); *F23C 2206/10* (2013.01)

(58) Field of Classification Search
CPC ........ B01D 45/16; B01D 45/12; B01D 45/08; B01D 45/06; B01D 53/24; B04C 5/04;
(Continued)

(56) References Cited

U.S. PATENT DOCUMENTS 3,273,320 A 9/1966 Lawrence et al.

FOREIGN PATENT DOCUMENTS

| CN | 2416376 Y | 1/2001 |
| CN | 201377787 Y | 1/2010 |

(Continued)

OTHER PUBLICATIONS

European Patent Office, Supplementary European Search Report for EP Patent Application No. 17896996.0, dated Oct. 8, 2019.
(Continued)

*Primary Examiner* — Lucas A Stelling
*Assistant Examiner* — Hafiz Muhammad Aamir
(74) *Attorney, Agent, or Firm* — Han IP PLLC; Andy M. Han

(57) ABSTRACT

A cyclone separator is disclosed. The cyclone separator includes a housing that forms a separation chamber, a central cylinder made of a non-metal refractory material and located inside the housing, and a support structure that supports the central cylinder. The separation chamber is divided by the central cylinder into an outer separation chamber and an inner separation chamber. The separation chamber includes an inlet and an outlet that are in communication with the outer and inner separation chambers, respectively. The support structure comprises a hollowed-out upwardly-arched structure that is connected to an inner wall of the separation
(Continued)

chamber by continuous pouring or masonry, with an arch face of the support structure being connected to a lower end of the central cylinder to support the central cylinder. The central cylinder is connected to both the housing and the supporting structure by continuous pouring or masonry.

7 Claims, 4 Drawing Sheets

(51) Int. Cl.
   *B04C 5/04* (2006.01)
   *B04C 5/13* (2006.01)
   *B04C 5/085* (2006.01)
   *F23C 10/10* (2006.01)
   *F23J 15/02* (2006.01)

(58) Field of Classification Search
   CPC .. B04C 5/13; B04C 5/103; B04C 5/06; B04C 5/085; F23C 10/08; F23C 10/10; B01J 8/0055; F23J 2217/40; F23J 15/027
   See application file for complete search history.

(56) References Cited

FOREIGN PATENT DOCUMENTS

| | | |
|---|---|---|
| CN | 106642088 B1 | 8/2018 |
| DE | 3705793 A1 | 11/1987 |
| WO | WO 8404471 A1 | 11/1984 |

OTHER PUBLICATIONS

European Patent Office, Communication regarding EP Patent Application No. 17896996.0, dated Oct. 8, 2019.
State Intellectual Property Office, First Office Action for Chinese Patent Application No. 201710089043.5, dated May 29, 2018.

ent cylinder made of non-metal refractory material is provided. The cyclone separator includes a housing that forms a separation chamber, as well as a central cylinder located inside the separation chamber. An inlet is provided on a side wall of the housing, and an outlet is provided on a top end of the housing. The central cylinder divides the separation chamber into an outer separation chamber and an inner separation chamber. Specifically, the space inside of the central cylinder is the inner separation chamber, and the space outside of the central cylinder is the outer separation chamber. Moreover, the outer separation chamber is in communication with the inlet, and the inner separation chamber is in communication with the outlet.

CYCLONE SEPARATOR HAVING CENTRAL CYLINDER MADE OF NON-METAL REFRACTORY MATERIAL

CROSS-REFERENCE TO RELATED APPLICATION

This application is the U.S. national stage application of International Application No. PCT/CN2017/088077, filed on Jun. 13, 2017, which claims the priority benefit of China Patent Application No. 201710089043.5, filed on Feb. 20, 2017. The above-identified patent applications are hereby incorporated by reference in their entirety.

TECHNICAL FIELD

The present disclosure relates to the technical field of circulating fluidized bed apparatuses, and more specifically to a cyclone separator having a central cylinder made of non-metal refractory material.

BACKGROUND

A cyclone separator is one of the key components in a coal gas circulating fluidized bed gasification system. The cyclone separator mainly functions to separate a large amount of high temperature solid substances from a gas stream and send the separated substances back to a furnace chamber, so as to ensure multiple burning reaction cycles of a fuel with a desulfurizing agent. A central cylinder is a key component of the cyclone separator. The central cylinder operates in an environment intensely scoured by a high-temperature dust-containing flue gas of over 900° C. Conventionally, a central cylinder comprises a cylindrical structure made of metal. Such a central cylinder has a rather short service life due to its poor performance in resisting thermal deformation and scouring, and thus requires to be replaced every two years or so. If not replaced, the deformed central cylinder would not only reduce the separation efficiency of the cyclone separator, but also increase the wearing of a rear flue and the burden of a subsequent dust remover. In addition, replacing the central cylinder requires a system shutdown, and the replacing process involves complex disassembly and reassembly, which demands a large amount of labor and time, increasing the cost of operation and maintenance. Moreover, a metal central cylinder is usually expensive to manufacture. Therefore, traditional cyclone separators suffer from obvious technical shortcomings such as a heavy investment, a high cost of manufacturing, a high cost of maintenance, and a short service life.

SUMMARY

This section is for the purpose of summarizing some aspects of the present disclosure and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present disclosure.

An object of the present disclosure is to disclose a cyclone separator having a central cylinder made of non-metal refractory material that is highly capable of resisting thermal deformation and scouring.

According to one aspect of the present disclosure, a cyclone separator having a central cylinder made of non- Specifically, the central cylinder is made of a non-metal refractory material, which enables the central cylinder to be resistant to wearing and deformation under high temperature.

The cyclone separator further includes a support structure that is radially provided on an inner wall of the separation chamber. The support structure is a hollowed-out upwardly arched structure, and an arch face of the support structure is connected to a lower end of the central cylinder for supporting the central cylinder.

An upper end of the central cylinder and the top end of the separation chamber are connected by continuous pouring or masonry. Also, the lower end of the central cylinder and the support structure are connected by continuous pouring or masonry. In addition, the inner wall of the separation chamber and the support structure are connected by continuous pouring or masonry.

In some embodiments, a slag trap may be provided below the separation chamber, wherein the separation chamber is in communication with the slag trap.

In some embodiments, the housing may include a first cylindrical section, a frustum section, and a second cylindrical section. The housing may be integrally formed or otherwise structured. An inner diameter of the first cylindrical section may be greater than an inner diameter of the second cylindrical section.

In some embodiments, the first cylindrical section may include a cylindrical tube and a cover plate. The inlet of the separation chamber may be provided on a side wall of the cylindrical tube, and the outlet of the separation chamber may be provided on the cover plate. Specifically, the outlet may be connected to the cover plate at a location that is located within the central cylinder.

In some embodiments, the arch face of the support structure forms a support surface that opposes or otherwise faces towards a lower side of the central cylinder.

In some embodiments, the support structure is a cross-shaped structure that has two arched beams that cross one another. Ends of each of the two arched beams are connected to the inner wall of the separation chamber by continuous pouring or masonry.

In some embodiments, the support structure is a grid structure formed by a plurality of arched beams. Ends of each of the arched beams are connected to the inner wall of the separation chamber by continuous pouring or masonry.

Beneficial effects of the present disclosure are as follows: the separation chamber, the central cylinder, and the support structure of the cyclone separator are manufactured by continuous masonry or pouring, which enables a simple process of manufacturing and reduces a cost of manufacturing by more than 70%. Moreover, the non-metal central cylinder of the present disclosure is resistant to deformation, wearing and scouring, which enables a long service life. In addition, even after a period of time of service, the central cylinder does not require a replacement; rather, only a repair or patching of the central cylinder is required before the central cylinder is put into service again, which enables a low cost of maintenance and operation.

BRIEF DESCRIPTION OF THE DRAWINGS

These and other features, aspects, and advantages of the present disclosure will become better understood with regard to the following description, appended claims, and accompanying drawings.

In FIGS. 1-4: 1 denotes a housing; 11 denotes a first cylindrical section; a denotes an inlet; b denotes an outlet; 12 denotes a frustum section; 13 denotes a second cylindrical section; 2 denotes a central cylinder; 3 denotes a radial support structure; 4 denotes a slag trap.

DETAILED DESCRIPTION OF THE PREFERRED EMBODIMENTS

The detailed description of the present disclosure is presented largely in terms of procedures, steps, logic blocks, processing, or other symbolic representations that directly or indirectly resemble the operations of devices or systems contemplated in the present disclosure. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the present disclosure. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the present disclosure do not inherently indicate any particular order nor imply any limitations in the present disclosure.

The present disclosure is further illustrated in the following two embodiments with reference to the accompanying drawings.

First Embodiment

Figure 1:
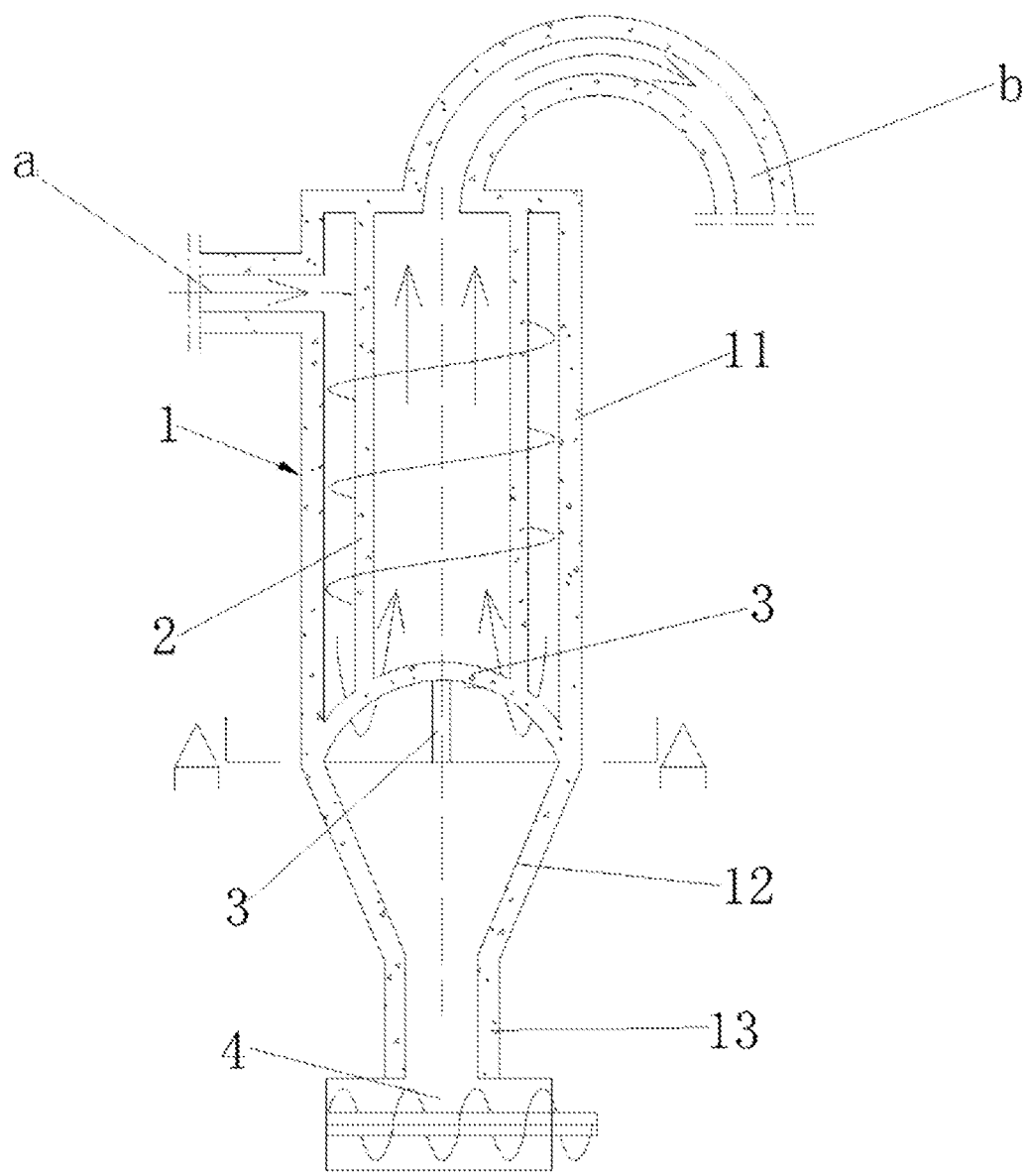
FIG. 1 is a schematic diagram illustrating a primary sectional view of a cyclone separator according to a first embodiment of the present disclosure.
Figure 2:
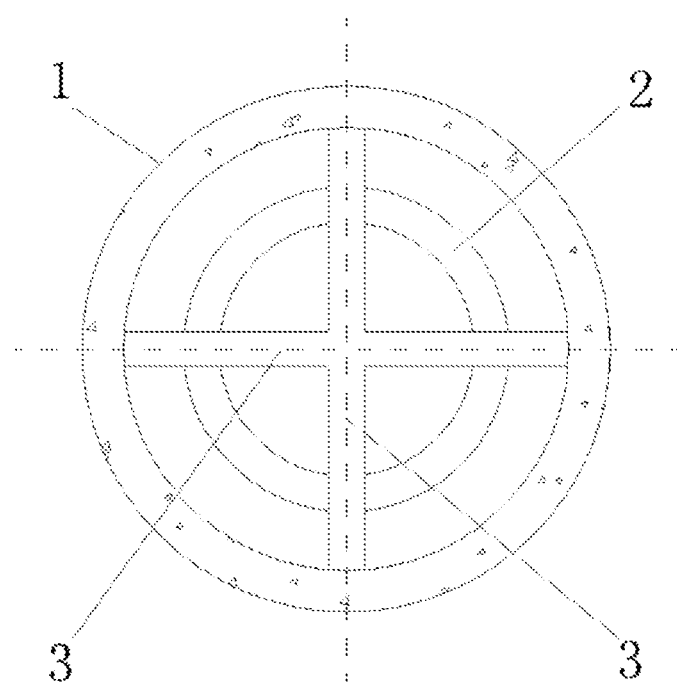
FIG. 2 is a schematic diagram illustrating a sectional view along line A-A of FIG. 1.

As shown in FIGS. 1 and 2, a cyclone separator includes a housing 1 and a central cylinder 2. An inner wall of the housing 1 is made of a non-metal material that is resistant to high temperature and wearing. Via a process of pouring or masonry, the non-metal material is shaped to form a separation chamber within the housing 1 of the cyclone separator. The housing 1 includes a first cylindrical section 11, a frustum section 12, and a second cylindrical section 13. A high temperature coal gas may be easily formed as a cyclone inside the cyclone separator. An inner diameter of the first cylindrical section 11 is greater than that of the second cylindrical section 13, thereby providing enough space for a separation process that separates coal slag from a coal-slag-containing high temperature coal gas. The first cylindrical section 11 includes a cylindrical tube and a cover plate. The housing 1 is integrally structured. The integrally structured housing 1 is firm and durable. A central cylinder 2 is provided inside the separation chamber. Specifically, the central cylinder 2 is located within the first cylindrical section 11. The central cylinder 2 is made, by pouring or masonry, of a non-metal material that is resistant to high temperature and wearing. The non-metal central cylinder 2 is thus resistant to thermal deformation, wearing, and scouring, able to provide a long service life.

An inlet a is provided on a side wall of the housing 1, and an outlet b is provided on a top end of the housing 1. Specifically, the inlet a is provided on a side wall of the cylindrical tube of the first cylindrical section 11, and the outlet b is provided on the cover plate of the first cylindrical section 11. The outlet b is in communication with the central cylinder 2. The outlet b is configured to exhaust a high temperature coal gas that is separated from the coal slag in the separation process. That is, the coal-slag-containing high temperature coal gas is introduced into the cyclone separator from the inlet a, and subsequently forms a cyclone along a tangential direction of a cross-sectional circle of the first cylindrical section 11. The separated high temperature coal gas is exhausted from the outlet b via the central cylinder 2, and the separated coal slag falls into a slag trap 4.

A radial support structure 3 is provided on an inner wall of the separation chamber of the housing 1. The radial support structure 3 is made of a non-mental material resistant to high temperature and wearing by means of continuous pouring or masonry. The radial support structure 3 and the separation chamber are connected by continuous pouring or masonry. The radial support structure 3 comprises a cross-shaped structure composed of two arched beams that cross one another. The weight of the central cylinder 2 is uniformly distributed on the radial support structure 3. In addition, the cross-shaped structure is a hollowed-out structure, which not only serves as a support, but also enables the separation chamber to be in communication with the slag trap 4. The radial support structure 3 is an integrally-formed structure. The integrally structured radial support structure 3 is firm and durable. The four ends of the radial support structure 3 are connected to the inner wall of the separation chamber by continuous pouring or masonry. Specifically, the four ends of the radial support structure 3 are located at an end of the first cylindrical section 11. An upper end of the central cylinder 2 is connected to the top end of the separation chamber (i.e., the cover plate) by continuous pouring or masonry. A lower end of the central cylinder 2 is connected to the radial support structure 3 by continuous pouring or masonry.

In the present disclosure, a non-metal material resistant to high temperature and wearing is adopted; the separation chamber of the cyclone separator, the central cylinder 2, and the radial support structure 3 are integrally formed by continuous pouring or masonry, which enables a simple manufacturing process while reducing a cost of manufacturing. In addition, the central cylinder 2 does not require to be replaced after serving for a period of time; rather, only a repair or patching is needed before the central cylinder 2 can become operational again. This enables a low cost of operation and maintenance.

Each of the two arched beams of radial support structure 3 is arched upwardly towards the central cylinder 2, such that the radial support structure 3 provides a support surface that is arched. The support surface provides a high support strength and a great bearing capacity to support the central cylinder 2. The coal slag-containing high temperature coal gas forms a cyclone for separation. The radial support structure 3 arches towards the central cylinder 2, thereby enabling the separated high temperature coal gas to move upwardly along the central cylinder 2 and be exhausted from the outlet b. The slag trap 4 is provided below the separation chamber. The slag trap 4 is in communication with the separation chamber. The slag trap 4 is located below the radial support structure 3. The coal slag that has been separated from the coal gas is thus collected in the slag trap 4.

Second Embodiment

Figure 3:
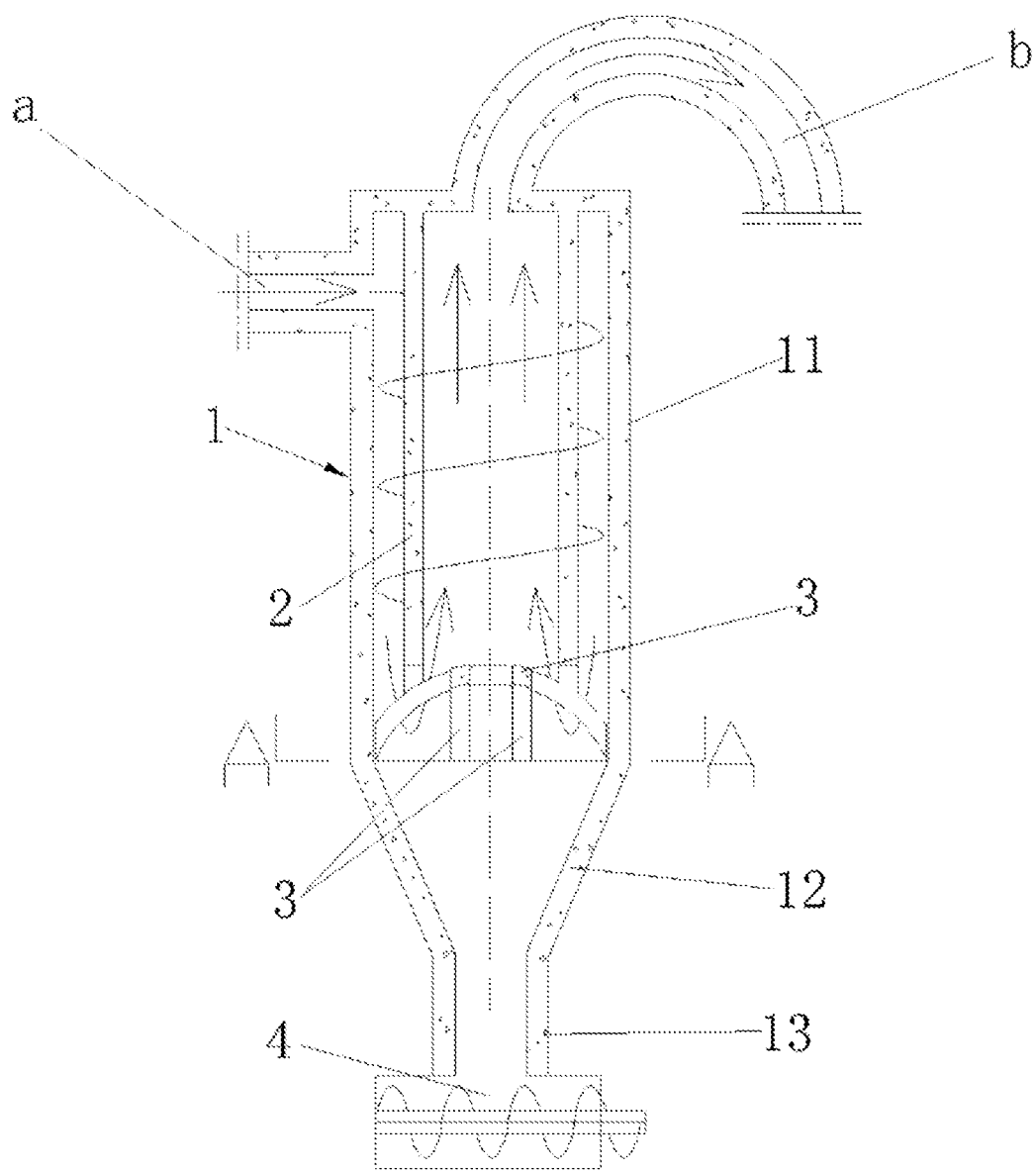
FIG. 3 is a schematic diagram illustrating a primary sectional view of a cyclone separator according to a second embodiment of the present disclosure.
Figure 4:
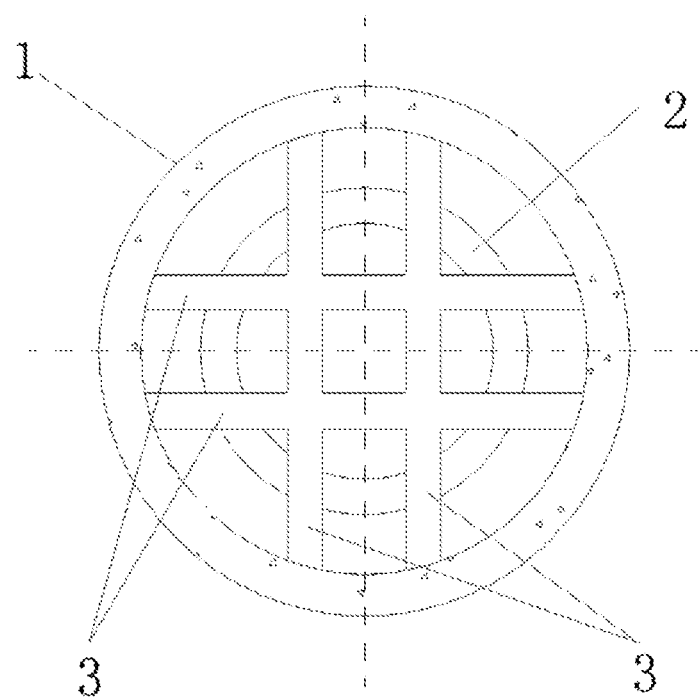
FIG. 4 is a schematic diagram illustrating a sectional view along line A-A of FIG. 3.

As shown in FIGS. 3 and 4, in a second embodiment of the cyclone separator, the radial support structure 3 of the cyclone separator is changed from a cross-shaped structure, as shown in the first embodiment of the cyclone separator, to a #-shaped structure. In the second embodiment, the radial support structure 3 is a #-shaped structure composed of four arched beams. The weight of the central cylinder 2 is uniformly distributed on the radial support structure 3 of the #-shaped structure. In addition, the #-shaped structure is a hollowed-out structure, which enables the separation chamber to be in communication with the slag trap 4. The radial support structure 3 is an integrally-formed structured. The integrally structured radial support structure 3 is firm and durable. The eight ends of the radial support structure 3 are connected to the inner wall of the separation chamber by continuous pouring or masonry. Specifically, the eight ends of the radial support structure 3 are located at end of the first cylindrical section 11.

In some other embodiments, the number of arched beams of the radial support structure 3 may be further increased to form a grid. Namely, the support structure 3 is a grid that is composed of a plurality of arched beams.

The description above only describes some implementations of the present disclosure. A person skilled in the art can also make various variations and improvements without departing from the creative idea of the present disclosure, all of which would fall within the scope of protection of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A cyclone separator, comprising:
a housing that forms a separation chamber, an inlet of the separation chamber being provided on a side wall of the housing, an outlet of the separation chamber being provided on a top end of the housing;
a central cylinder located inside the housing, the central cylinder dividing the separation chamber into an outer separation chamber and an inner separation chamber, the outer separation chamber being in communication with the inlet, the inner separation chamber being in communication with the outlet; and
a support structure located inside the housing for supporting the central cylinder, the support structure being a hollowed-out upwardly-arched structure radially provided on an inner wall of the separation chamber, an arch face of the support structure being connected to a lower end of the central cylinder,
wherein:
the central cylinder is made of a non-metal refractory material, resistant to wearing and deformation under high temperature,
an upper end of the central cylinder is connected to an inner side of the top end of the housing by continuous pouring or masonry,
the lower end of the central cylinder is connected to the support structure by continuous pouring or masonry, and
the support structure is connected to the inner wall of the separation chamber by continuous pouring or masonry.

2. The cyclone separator of claim 1, further comprising:
a slag trap provided below the separation chamber, wherein the separation chamber is in communication with the slag trap.

3. The cyclone separator of claim 1, wherein the housing comprises a first cylindrical section, a frustum section and a second cylindrical section, wherein an inner diameter of the first cylindrical section is greater than an inner diameter of the second cylindrical section, wherein the frustum section is positioned between the first and second cylindrical sections, and wherein the housing is integrally structured.

4. The cyclone separator of claim 3, wherein the first cylindrical section comprises a cylindrical tube and a cover plate, wherein the inlet is provided on a side wall of the cylindrical tube, and wherein the outlet is provided on the cover plate at a location of the cover plate that is within the central cylinder.

5. The cyclone separator of claim 1, wherein the arch face opposes a lower side of the central cylinder.

6. The cyclone separator of claim 5, wherein the support structure comprises two arched beams that cross one another, and wherein ends of each of the two arched beams are connected to the inner wall of the separation chamber by continuous pouring or masonry.

7. The cyclone separator of claim 5, wherein the support structure is a grid formed by a plurality of arched beams, and wherein ends of each of the plurality of arched beams are connected to the inner wall of the separation chamber by continuous pouring or masonry.

* * * * *